US008385811B1

(12) United States Patent
Gedlinske et al.

(10) Patent No.: US 8,385,811 B1
(45) Date of Patent: Feb. 26, 2013

(54) SYSTEM AND METHOD FOR PROCESSING FORMS USING COLOR

(75) Inventors: Mark Gedlinske, Plymouth, MN (US); Michelle Edenborg, Minnetonka, MN (US)

(73) Assignee: Data Recognition Corporation, Maple Grove, MN (US)

( * ) Notice: Subject to any disclaimer, the term of this patent is extended or adjusted under 35 U.S.C. 154(b) by 197 days.

(21) Appl. No.: 12/465,842

(22) Filed: May 14, 2009

Related U.S. Application Data

(63) Continuation of application No. 10/364,758, filed on Feb. 11, 2003, now abandoned.

(51) Int. Cl.
*G09B 3/00* (2006.01)
(52) U.S. Cl. ......... 434/350; 434/353; 434/322; 434/323
(58) Field of Classification Search .................. 434/350, 434/353, 322, 323
See application file for complete search history.

(56) References Cited

U.S. PATENT DOCUMENTS

| | | | |
|---|---|---|---|
| 4,120,049 A | 10/1978 | Thaler et al. | |
| 4,205,780 A | * 6/1980 | Burns et al. | 235/454 |
| 4,300,123 A | 11/1981 | McMillin et al. | |
| 4,437,838 A | 3/1984 | Tauber et al. | |
| 4,471,217 A | * 9/1984 | Engel | 235/468 |
| 4,478,584 A | 10/1984 | Kaney | |
| 4,553,141 A | 11/1985 | Flasza et al. | |
| 4,596,468 A | 6/1986 | Simeth | |
| 4,626,892 A | 12/1986 | Nortrup et al. | |
| 4,705,479 A | 11/1987 | Maron | |
| 4,708,503 A | 11/1987 | Poor | |
| 4,813,077 A | 3/1989 | Woods et al. | |
| 4,817,179 A | 3/1989 | Buck | |
| 4,820,165 A | 4/1989 | Kanapa | |
| 4,837,842 A | 6/1989 | Holt | |
| 4,958,284 A | * 9/1990 | Bishop et al. | 434/353 |
| 4,967,354 A | 10/1990 | Buchanan | |
| 4,978,305 A | 12/1990 | Kraft | |
| 5,014,328 A | 5/1991 | Rudak | |

(Continued)

FOREIGN PATENT DOCUMENTS

| | | |
|---|---|---|
| EP | 0107010 B1 | 3/1994 |
| EP | 0374127 B1 | 4/1995 |

(Continued)

OTHER PUBLICATIONS

""Score Image" Processing of Constructed-Responses, Essays, and Writing Samples", *UNISCORE, Incorporated*, (1992), 3 pgs.

(Continued)

*Primary Examiner* — Robert J Utama
(74) *Attorney, Agent, or Firm* — Schwegman Lundberg & Woessner, P.A.

(57) ABSTRACT

Systems and methods are provided for improved processing of forms using color. One aspect is a method for processing a plurality of test answer sheets in a standardized test system. In various embodiments, each of the plurality of completed test answer sheets is recorded. The completed test answer sheet is scanned, an identifier for the completed test answer sheet is determined, and three or more colors are electronically recorded to form a multicolor image on a computer readable medium. The multicolor image is representative of the scanned completed test answer sheet. The multicolor image is associated with the identifier in a database. Each of the plurality of completed test answer sheets is scored. Scoring the test answer sheets includes digitally modifying at least one color in the multicolor image at an image use point to assist with scoring the completed test answer sheets. Other aspects are provided herein.

20 Claims, 13 Drawing Sheets

U.S. PATENT DOCUMENTS

| | | | | |
|---|---|---|---|---|
| 5,014,329 | A | * | 5/1991 | Rudak ............................ 382/163 |
| 5,046,005 | A | | 9/1991 | Vilardebo et al. |
| 5,321,611 | A | | 6/1994 | Clark et al. |
| 5,386,482 | A | | 1/1995 | Basso et al. |
| 5,433,615 | A | | 7/1995 | Clark |
| 5,437,554 | A | | 8/1995 | Clark et al. |
| 5,445,369 | A | | 8/1995 | Golicz et al. |
| 5,452,379 | A | | 9/1995 | Poor |
| 5,458,493 | A | * | 10/1995 | Clark et al. ................... 434/322 |
| 5,466,159 | A | | 11/1995 | Clark et al. |
| 5,506,946 | A | | 4/1996 | Bar et al. |
| 5,509,064 | A | | 4/1996 | Welner et al. |
| 5,513,994 | A | | 5/1996 | Kershaw et al. |
| 5,531,429 | A | | 7/1996 | Clark |
| 5,558,521 | A | * | 9/1996 | Clark et al. ................... 434/322 |
| 5,672,060 | A | | 9/1997 | Poor |
| 5,690,497 | A | | 11/1997 | Clark et al. |
| 5,709,551 | A | | 1/1998 | Clark et al. |
| 5,716,213 | A | * | 2/1998 | Clark et al. ................... 434/322 |
| 5,718,591 | A | | 2/1998 | Clark et al. |
| 5,735,694 | A | | 4/1998 | Clark et al. |
| 5,752,836 | A | | 5/1998 | Clark et al. |
| 5,775,918 | A | * | 7/1998 | Yanagida et al. ............. 434/353 |
| 5,817,243 | A | | 10/1998 | Shaffer |
| 5,826,238 | A | | 10/1998 | Chen et al. |
| 5,827,070 | A | | 10/1998 | Kershaw et al. |
| 5,947,747 | A | | 9/1999 | Walker et al. |
| 5,949,551 | A | * | 9/1999 | Miller et al. ................... 358/408 |
| 5,987,149 | A | | 11/1999 | Poor |
| 5,987,302 | A | | 11/1999 | Driscoll et al. |
| 5,991,595 | A | | 11/1999 | Romano et al. |
| 6,035,058 | A | * | 3/2000 | Savakis et al. ................ 382/163 |
| 6,042,384 | A | | 3/2000 | Loiacono |
| 6,109,522 | A | | 8/2000 | Force et al. |
| 6,120,299 | A | | 9/2000 | Trenholm et al. |
| 6,155,839 | A | | 12/2000 | Clark et al. |
| 6,159,018 | A | | 12/2000 | Clark et al. |
| 6,168,440 | B1 | | 1/2001 | Clark et al. |
| 6,173,154 | B1 | | 1/2001 | Kucinski et al. |
| 6,178,308 | B1 | | 1/2001 | Bobrow et al. |
| 6,181,909 | B1 | | 1/2001 | Burstein et al. |
| 6,183,260 | B1 | | 2/2001 | Clark et al. |
| 6,183,261 | B1 | | 2/2001 | Clark et al. |
| 6,193,521 | B1 | | 2/2001 | Clark et al. |
| 6,212,130 | B1 | | 4/2001 | Brazeal, Jr. et al. |
| 6,234,806 | B1 | | 5/2001 | Trenholm et al. |
| 6,256,399 | B1 | | 7/2001 | Poor |
| 6,267,601 | B1 | | 7/2001 | Jongsma et al. |
| 6,311,040 | B1 | | 10/2001 | Kucinski et al. |
| 6,366,759 | B1 | | 4/2002 | Burstein et al. |
| 6,366,760 | B1 | * | 4/2002 | Kucinski et al. .............. 434/359 |
| 6,386,883 | B2 | | 5/2002 | Siefert |
| 6,498,920 | B1 | | 12/2002 | Simon |
| 6,505,031 | B1 | | 1/2003 | Slider et al. |
| 6,577,846 | B2 | * | 6/2003 | Poor ............................... 434/353 |
| RE38,275 | E | * | 10/2003 | Ruppert ........................ 382/163 |
| 6,650,793 | B1 | * | 11/2003 | Lund et al. .................... 382/299 |
| 6,684,052 | B2 | * | 1/2004 | Kucinski et al. .............. 434/359 |
| 6,741,967 | B1 | | 5/2004 | Wu et al. |
| 6,751,351 | B2 | | 6/2004 | Knowles et al. |
| 6,772,081 | B1 | | 8/2004 | Gedlinske et al. |
| 6,816,702 | B2 | | 11/2004 | Kuntz et al. |
| 6,879,805 | B2 | * | 4/2005 | Epstein ......................... 434/353 |
| 6,925,601 | B2 | | 8/2005 | Moore et al. |
| 7,035,748 | B2 | | 4/2006 | Gedlinske et al. |
| 7,099,620 | B2 | | 8/2006 | Miller |
| 7,406,392 | B2 | | 7/2008 | Gedlinske et al. |
| 2001/0031457 | A1 | | 10/2001 | Pfenninger et al. |
| 2002/0110797 | A1 | * | 8/2002 | Poor ............................... 434/353 |
| 2002/0110798 | A1 | * | 8/2002 | Kucinski et al. .............. 434/359 |
| 2002/0155419 | A1 | | 10/2002 | Banerjee et al. |
| 2002/0172931 | A1 | | 11/2002 | Greene et al. |
| 2002/0178244 | A1 | | 11/2002 | Brittenham et al. |
| 2002/0182578 | A1 | | 12/2002 | Rachman et al. |
| 2003/0180703 | A1 | | 9/2003 | Yates et al. |
| 2003/0224340 | A1 | * | 12/2003 | Housman et al. ............. 434/353 |
| 2004/0067478 | A1 | * | 4/2004 | Epstein ......................... 434/353 |
| 2004/0126036 | A1 | | 7/2004 | Poor |
| 2004/0126745 | A1 | | 7/2004 | Bell et al. |
| 2004/0267500 | A1 | | 12/2004 | Gedlinske et al. |
| 2006/0265170 | A1 | | 11/2006 | Gedlinske et al. |
| 2009/0011396 | A1 | | 1/2009 | Gedlinske et al. |

FOREIGN PATENT DOCUMENTS

| | | |
|---|---|---|
| EP | 0374892 B1 | 4/1997 |
| WO | WO-9004004 A1 | 4/1990 |
| WO | WO-9109734 A1 | 7/1991 |

OTHER PUBLICATIONS

"U.S. Appl. No. 10/140,768, Advisory Action mailed Oct. 20, 2006", 3 pgs.

"U.S. Appl. No. 10/140,768, Appeal Brief filed Feb. 20, 2007", 28 pgs.

"U.S. Appl. No. 10/140,768, Appeal Brief filed May 19, 2008", 36 pgs.

"U.S. Appl. No. 10/140,768, Examiner's Answer mailed Aug. 5, 2008 to Appeal Brief filed May 19, 2008", 34 pgs.

"U.S. Appl. No. 10/140,768, Final Office Action mailed Jun. 23, 2006", 19 pgs.

"U.S. Appl. No. 10/140,768, Non Final Office Action mailed Jul. 16, 2007", 19 pgs.

"U.S. Appl. No. 10/140,768, Non Final Office Action mailed Dec. 20, 2005", 14 pgs.

"U.S. Appl. No. 10/140,768, Response filed Mar. 20, 2006 to Non Final Office Action mailed Dec. 20, 2005", 21 pgs.

"U.S. Appl. No. 10/140,768, Response filed Sep. 25, 2006 to Final Office Action mailed Jun. 23, 2006", 18 pgs.

"U.S. Appl. No. 10/140,769, Final Office Action mailed Mar. 4, 2005", 19 pgs.

"U.S. Appl. No. 10/140,769, Final Office Action mailed Aug. 29, 2007", 15 pgs.

"U.S. Appl. No. 10/140,769, Non Final Office Action mailed Apr. 19, 2004", 17 pgs.

"U.S. Appl. No. 10/140,769, Non Final Office Action mailed Jul. 27, 2005", 20 pgs.

"U.S. Appl. No. 10/140,769, Non Final Office Action mailed Sep. 10, 2003", 15 pgs.

"U.S. Appl. No. 10/140,769, Non Final Office Action mailed Dec. 27, 2006", 15 pgs.

"U.S. Appl. No. 10/140,769, Non-Final Office Action mailed Jan. 25, 2008", 15 pgs.

"U.S. Appl. No. 10/140,769, Response filed Jan. 12, 2004 to Non Final Office Action mailed Sep. 10, 2003", 23 pgs.

"U.S. Appl. No. 10/140,769, Response filed Jun. 12, 2007 to Non Final Office Action mailed Dec. 27, 2006", 20 pgs.

"U.S. Appl. No. 10/140,769, Response filed Aug. 5, 2004 to Non Final Office Action mailed Apr. 19, 2004", 19 pgs.

"U.S. Appl. No. 10/140,769, Response filed Oct. 29, 2007 to Final Office Action mailed Aug. 29, 2007", 22 pgs.

"U.S. Appl. No. 10/140,769, Response filed Dec. 27, 2005 to Non Final Office Action mailed Jul. 27, 2005", 19 pgs.

"U.S. Appl. No. 10/364,758, Final Office Action mailed Nov. 15, 2005", 8 pgs.

"U.S. Appl. No. 10/364,758, Non Final Office Action mailed May 18, 2007", 15 pgs.

"U.S. Appl. No. 10/364,758, Non Final Office Action mailed Aug. 8, 2006", 7 pgs.

"U.S. Appl. No. 10/364,758, Non Final Office Action mailed Nov. 1, 2004", 12 pgs.

"U.S. Appl. No. 10/364,758, Non-Final Office Action mailed Oct. 29, 2007", 19 pgs.

"U.S. Appl. No. 10/364,758, Response filed Feb. 28, 2008 to Non-Final Office Action mailed Oct. 29, 2007", 14 pages.

"U.S. Appl. No. 10/364,758, Response filed Feb. 28, 2005 to Non Final Office Action mailed Nov. 1, 2004", 14 pgs.

"U.S. Appl. No. 10/364,758, Response filed Aug. 14, 2007 to Non Final Office Action mailed May 18, 2007", 15 pgs.

"U.S. Appl. No. 10/364,758, Response filed Sep. 13, 2004 to Restriction Requirement mailed Aug. 13, 2004", 1 pg.

"U.S. Appl. No. 10/364,758, Response filed Nov. 6, 2006 to Non Final Office Action mailed Aug. 8, 2006", 14 pgs.

"U.S. Appl. No. 10/364,758, Restriction Requirement mailed Aug. 13, 2004", 4 pgs.
"U.S. Appl. No. 10/364,758, Final Office Action mailed Nov. 14, 2008", 22 pgs.
"Image Processing of Open-Ended Questions", *UNISCORE, Incorporated*, (1992), 4 pgs.
Anderson, Jonathan, "The Role of the Computer in Assessment: Recent Developments in Australia [Journal Paper]", *Journal of Educational Processing*, 10(1-2), (1973), 4-11.
Ateya, A., "Drop-Out Colors", *RIT Research Corporation*, (Sep. 1999), 8 pgs.
Brown, Peter, et al., "Validation: Cost effective external evaluation", *Australian Journal of Education Technology*, 6(2), (1990), 1-6.
Burnett, Ginny, "System and Method for Reporting Test Results", U.S. Appl. No. 10/140,770, filed May 7, 2002, 46 pgs.
Cason, Gerald J, et al., "Integrated Test Scoring, Performance Rating and Assessment Records Keeping", *Innovations in Medical Education, Association of American Medical Colleges*, Washington, D.C.., Paper presented at the annual meeting of the Association of Medical Colleges., (Nov. 1, 1987), 2-20.
Chesley, Jody, "Integrated System for Electronic Tracking and Control of Documents", U.S. Appl. No. 10/140,768, filed May 7, 2002, 38 pgs.
Chesley, Jody, "System for Generation of Statistical Examination Reports", U.S. Appl. No. 10/153,562, filed May 21, 2002, 53 pgs.
Chesley, Jody, "System for Programmable Presentment of Scoring Tasks to a Plurality of Reviewers", U.S. Appl. No. 10/140,769, filed May 7, 2002, 40 pgs.
Epstein, Marion G, "Computer Assisted Assembly of Tests at Educational Testing Service", *Educational Technology*, (Mar. 1, 1973), 23-24.
Feldker, Paul, "Online Computer Testing with Networked Apple II Microcomputers [Conference Paper]", *Conference on Computers in Physics Instruction. Proceedings. Addison-Wesley*. Redwood City, CA, USA, (1990), 510-511.
Foxon, Marguerite, "Evaluation of training and development programs: A review of the literature", *Australian Journal of Educational Technology*, 5 (2), (1989), 1-16.
Garris, Michael D, et al., "NIST Scoring Package User's Guide Release 1.0", *NTIS, U.S. Department of Commerce, Technology Administration, National Institute of Standards and Technology*, Oct. 1992, NISTIR 4950, 76 pgs.
Gathy, P, et al., "Computer-Assisted Self-Assessment (CASA) in Histology", *Computers Education.*, vol. 17, No. 2., (1991), 109-116.
Gedlinske, Mark, "System and Method for Processing Forms Using Color", U.S. Appl. No. 10/364,758, filed Feb. 11, 2003, 39 pgs.
Gedlinske, Mark, "System for Online Enrollment of Testing Candidates", U.S. Appl. No. 10/328,429, filed Dec. 23, 2002, 36 pgs.
Higgins, Colin A, et al., "Note-pad computers and the concept of Electronic Paper", *Information Services and Use*, vol. 11., (1991), 179-192.
Housman, Coy C., et al., "Constructed Response Scoring System", U.S. Appl. No. 60/384,440, filed May 31, 2002, 161 pgs.
Housman, Coy C., et al., "Constructed Response Scoring System", U.S. Appl. No. 60/387,100, filed Jun. 7, 2002, 22 pgs.
Martz, Richard J, "Building the Computer Graphics Laboratory at Educational Testing Service [Conference Paper]", *Proceedings of NCGA's Computer Graphics 1987 Annual Conference and Exposition. Nat. Comput. Graphics Assoc*. 1987, vol. III. Fairfax, VA, USA, Princeton, NJ 08541, 194.
Meredith, Joseph C, et al., "Student Feedback as a tool in computer-assisted instruction (CAI) frame development", *Scientia Paedagogica Experimentalis*, vol. 7 (2)., (1970), 221-302.
Mizokawa, Donald T, et al., "Guidelines for Computer-Managed Testing", *Educational Technology*, Dec. 1984, 12-17.
Neuburger, Wayne F, "A Computer Support System for a Teacher Evaluation Model", *Paper presented at the National Association of Users of Computer Applications to Learning Conference*, (Oct. 28, 1976), 2-16.
Orthner, Ph.D, Helmuth F, "Computer Systems in Medical Education", *Proceedings, The Sixth Annual Symposium on Computer Applications in Medical Care, George Washington University Medical Center*, (1982), 1008-1010.
Pittman, James A, "Recognizing Handwritten Text [Conference Paper]", *Human Factors in Computing Systems. Reaching Through Technology. Conference Proceedings. ACM*.1991, New York, NY, USA., 271-275.
Reid-Green, Keith S, "A High Speed Image Processing System [Journal Paper]", *IMC Journal*, vol. 26, No. 2, March-April., USA, (1990), 12-14.
Sims, Rod, "Futures for computer-based training: Developing the learner-computer interface", *Australian Journal of Educational Technology*, 4(2),, (1988), 1-11.
Sunouchi, Haruo, et al., "Computer-Assisted Retrieval and Analysis for Educational Test Items", *3rd USA-Japan Computer Conference, Waseda University, School of Science and Engineering*, Tokyo, Japan, (1978), 198-202.
Thompson, John M, et al., "Educational Testing Service, Where the business of graphics is analysis", *Computer Graphics World*, December, (1986), 57-61.
Zuckerman, Ronald A, "Optical Scanning for Data Collection, Conversion & Reduction", *NTIS, U.S. Department of Commerce, National Technical Information Service*, August, Springfield, VA, USA, (1967), 49 pgs.

* cited by examiner

972

SESSION 2: SCIENCE SHORT-ANSWER QUESTIONS (CONTINUED)

44. [SCIENCE QUESTION NO. 44]

974

PLEASE STOP!
DO NOT GO ON TO
THE NEXT PAGE.

976

WRITTEN ANSWER
OUTSIDE OF
ANSWER AREA

PAGE 7
SECURE MATERIALS, MAY NOT BE DUPLICATED.
DO NOT WRITE IN THIS AREA   SECURITY NUMBER
437860
510195-1044501030
106

SYSTEM AND METHOD FOR PROCESSING FORMS USING COLOR

CROSS REFERENCE TO RELATED APPLICATIONS

This application is a continuation of U.S. application Ser. No. 10/364,758, filed on Feb. 11, 2003, now abandoned and is related to the following, commonly assigned U.S. patent applications: U.S. application Ser. No. 10/140,769, filed on May 7, 2002, and U.S. application Ser. No. 10/140,768, filed on May 7, 2002, applications of which are incorporated herein by reference in their entirety.

TECHNICAL FIELD

This application relates generally to systems and methods for processing forms having color markings and, more particularly, to systems and methods for processing standardized tests using color.

BACKGROUND

One method for evaluating the knowledge or skill of a person such as a student includes the use of standardized tests. Some tests include questions that are answered by filling in an appropriate oval in an associated bubble-type answer sheet. Some standardized tests include open-ended questions for which the answers to those questions are evaluated and scored by a human reviewer or a computer, also referred to herein as a reader. Some test-takers write answers outside of a scanned answer area, and some handwritten answers are difficult to read and process.

FIG. 1 illustrates one example of an answer sheet 100 for a standardized test. A section answer area 102 is used to answer multiple choice questions for a section of questions, and each multiple choice question is associated with a specific question answer area 104. Some test-takers unintentionally enter their answer at the incorrect location or wrong line on the answer sheet.

Known image scanners for processing large numbers of forms, such as standardized test answer sheets, drop out at least part of the visible spectrum (e.g. certain color(s)). For example, test-takers have been required to use a pencil such that the answer markings are capable of being detected by a dropout scanner. The ovals and the lettering are printed with a dropout background color so that the background does not interfere with detecting the answer markings. FIG. 2 illustrates one example of a scanned image of the answer sheet of FIG. 1 when the answer sheet 200 is marked with markings (such as a pencil or some black inks) which are detected by the scanner. However, some test-takers mark their answers using a color ink pen or other writing utensil that is not detected by the scanner. For example, some systems do not recognize blue, red or green ink. FIG. 3 illustrates one example of an image of the answer sheet of FIG. 1 when the markings on the answer sheet 300 are not detected. The resulting image is not able to be scored as it does not contain answer markings.

The illustrated answer sheet 100 of FIG. 1 also includes registration marks such as corner fiducials 106 and row fiducials 108 that can be detected by the dropout scanner. The fiducials are used to accurately position or register the answer sheet (without the dropped out background color) allowing the detected answer markings to be accurately scored. However, the detectable fiducial markings and the dropout background color are printed using different print stations, which can introduce a print registration error between the printed fiducial markings and background color. Scoring errors result when the print registration errors are large enough to cause an improper association between the answer and the answer choices.

Therefore, there is a need in the art to provide improved systems and methods for processing forms such as standardized tests.

SUMMARY

The above mentioned problems are addressed by the present subject matter and will be understood by reading and studying the following specification. The present subject matter provides improved systems and methods for processing forms that include color. Various embodiments provide improved systems and methods for processing standardized test forms.

One aspect is a method for processing a plurality of test answer sheets in a standardized test system. In various embodiments, each of the plurality of completed test answer sheets is recorded. The completed test answer sheet is scanned, an identifier for the completed test answer sheet is determined, and three or more colors are electronically recorded to form a multicolor image on a computer readable medium. The multicolor image is representative of the scanned completed test answer sheet. The multicolor image is associated with the identifier in a database. Each of the plurality of completed test answer sheets is scored. Scoring the test answer sheets includes digitally modifying at least one color in the multicolor image at an image use point to assist with scoring the completed test answer sheets.

One aspect is a test system. In various embodiments, the system includes at least one scanner, a database, and at least one image use point. The at least one scanner is capable of scanning a plurality of completed test answer sheets to determine identifiers for the plurality of completed test answer sheets and to record a plurality of multicolor images representative of the plurality of completed test answer sheets. Each of the multicolor images includes three or more colors. The database is capable of communicating with the at least one scanner, and associating the plurality of multicolor images with the identifiers for the plurality of completed test answer sheets. The at least one image use point is capable of communicating with the database to digitally modify at least one color in the plurality of multicolor images to assist with scoring the completed test answer sheets.

One aspect is another test system. In various embodiments, the test system includes a number of test booklets and a number of test answer sheets. The test booklets contain test questions. Each of the test booklets includes at least two question sections. Each of the at least two question sections includes a test color code. The test answer sheets are used in answering the test questions. Each of the test answer sheets includes at least two answer sections that are used to answer the at least two question sections in the test booklets. Each of the answer sections include an answer color code. The answer color code corresponds to the test color code to assist a test-taker with completing a given question section by marking answers in the corresponding answer section.

These and other aspects, embodiments, advantages, and features will become apparent from the following description and the referenced drawings.

DETAILED DESCRIPTION

The following detailed description refers to the accompanying drawings which show, by way of illustration, specific aspects and embodiments in which the present subject matter may be practiced. These embodiments are described in sufficient detail to enable those skilled in the art to practice the present subject matter. Other embodiments may be utilized and structural, logical, and electrical changes may be made without departing from the scope of the present subject matter. The following detailed description is, therefore, not to be taken in a limiting sense, and the scope of the present subject matter is defined only by the appended claims, along with the full scope of equivalents to which such claims are entitled.

The present subject matter provides improved systems and methods for processing forms that include color. Various embodiments provide improved systems and methods for processing standardized test forms. A standardized test system involves testing a large number of test-takers and processing a large number of completed test forms. According to various embodiments, a color scanner is used to process large numbers of forms. According to various embodiments, the systems and methods of the present subject matter perform a full visible spectrum scan that is capable of detecting a marking made in any visible color. Additionally, according to various embodiments, the systems and methods of the present subject matter are capable of capturing a color image to various color depths. Color depth is also referred to as a bit depth as it is related to the number of bits used for each pixel. According to various embodiments, the systems and methods of the present subject matter capture multicolor image(s) (e.g. at least one color in addition to black and white) and digitally modifies at least one color.

Figure 1:
FIG. 1 illustrates one example of an answer sheet for a standardized test.
Figure 2:
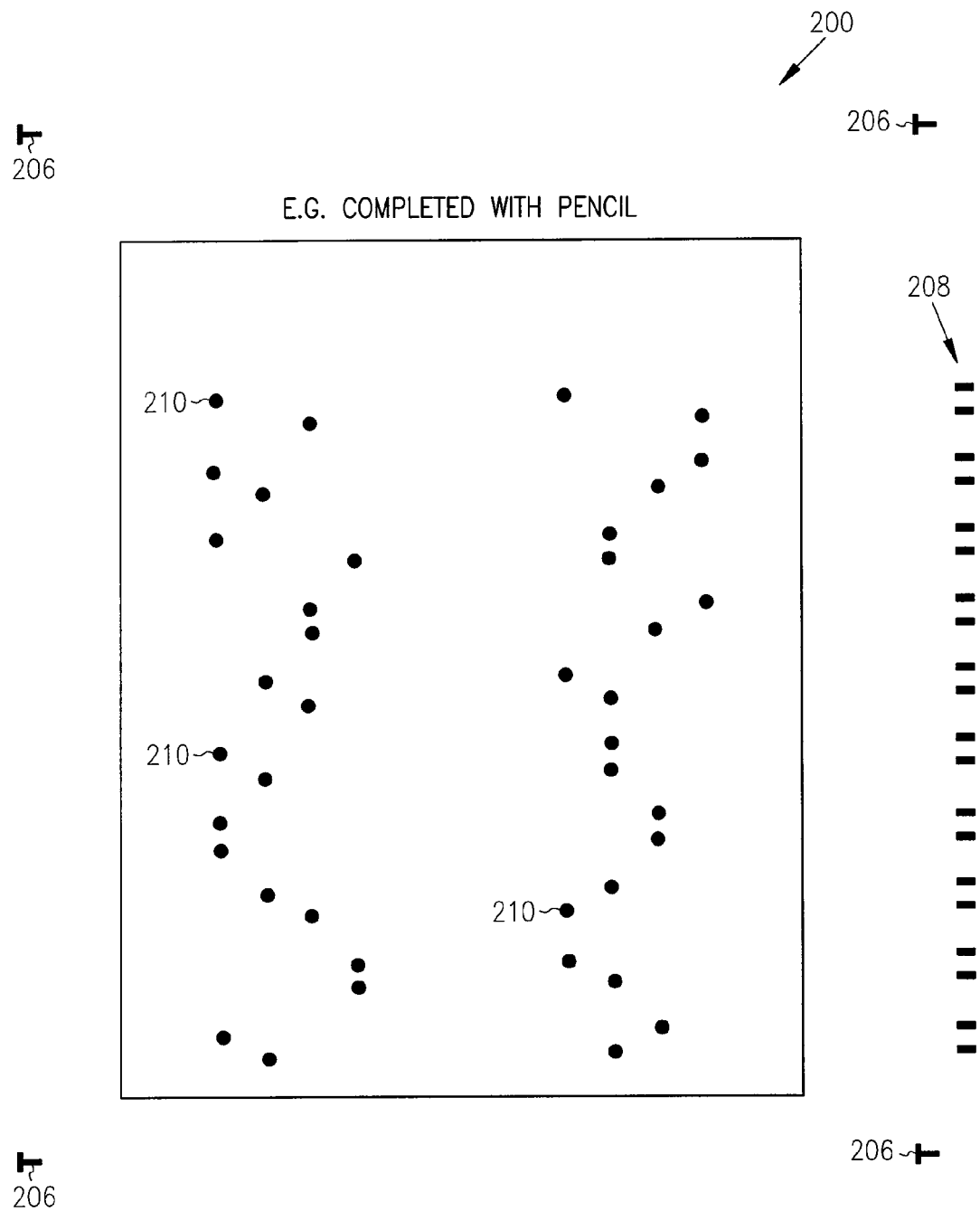
FIG. 2 illustrates one example of a scanned image of the answer sheet of FIG. 1 when the answer sheet is marked with marking which are detected by the dropout scanner.
Figure 3:
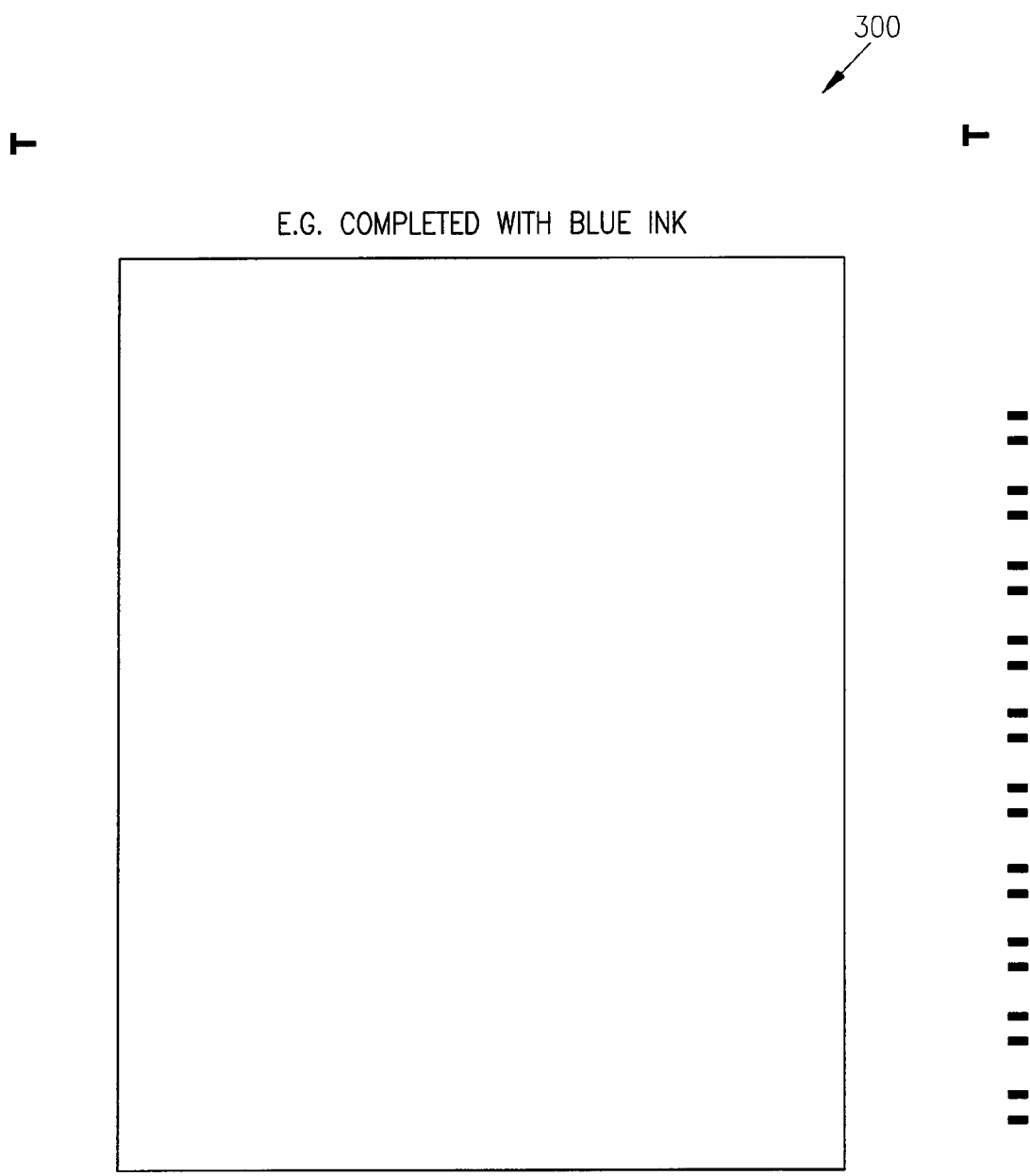
FIG. 3 illustrates one example of an image of the answer sheet of FIG. 1 when the markings on the answer sheet are not detected by the dropout scanner.
Figure 4:
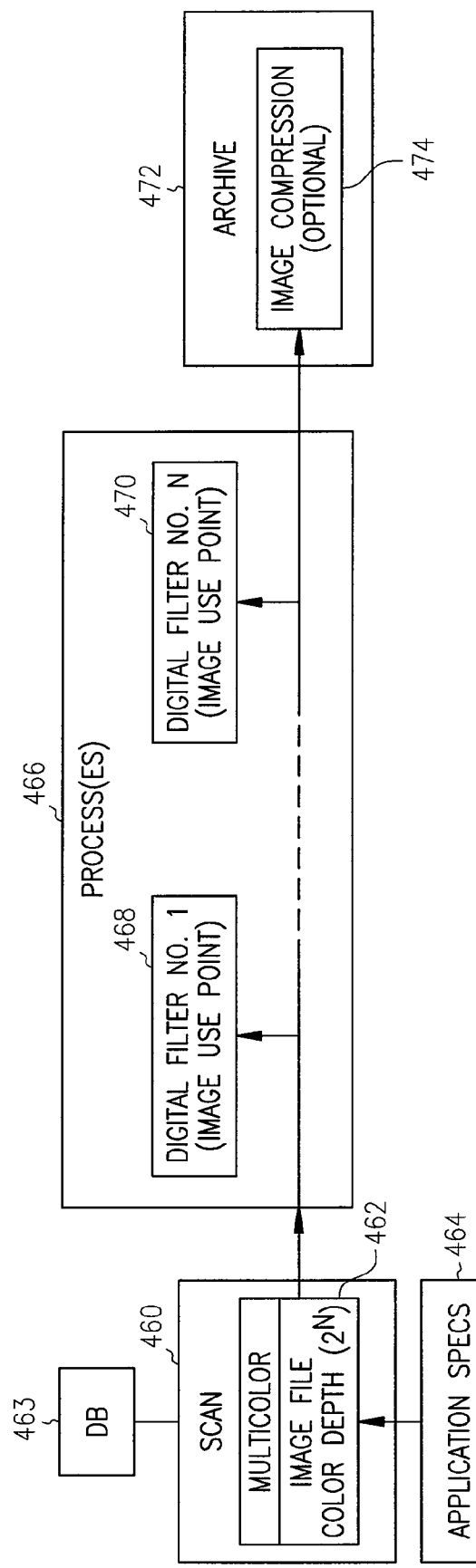
FIG. 4 illustrates a method for processing test answer sheets according to various embodiments of the present subject matter.

FIG. 4 illustrates a method for processing test answer sheets according to various embodiments of the present subject matter. A full visible spectrum scan is performed at 460. According to various embodiments, the scan 460 is capable of detecting any color on the forms. According to various embodiments, the scan 460 is performed by a color scanner adapted to process large quantities of forms. According to various embodiments, as is described with respect to FIG. 6, the scan 460 is performed by two or more dropout scanners that together are capable of detecting any color on the forms.

The scan records multicolor images of the forms, such as standardized test answer sheet, in at least one scanned image file 462 on at least one computer readable medium. The term "records" encompasses storing in a long-term or relatively long term memory, storing in a short term memory such as a RAM, or a storing in a transient signal on a databus and the like. The image file(s) 462 is (are) associated with a color depth, which refers to the number of bits used to define the color. For example, N bits are used to define $2^N$ distinct colors. One of ordinary skill in the art will appreciate, upon reading and comprehending this disclosure, that deeper color depth (more colors) is achieved at the cost of larger files which increases data storage costs and increases communication and processing bandwidth costs. According to various embodiments, application specifics 464 are used to determine a desirable color depth for a given application.

Additionally, the scan determines identifiers on the scanned sheets (also referred to herein as documents). One example of an identifier is a bar code, but the present subject matter is not so limited. One or multiple scanning devices can be used to capture the multicolor image and to determine the document identifiers. The multicolor images are associated with the identifiers in a database 463, which communicates with the scanner 460.

At 466, the scanned image file(s) is (are) processed at image use points (468 and 470) to score the test answer sheets. Although two image use points are illustrated, the processing of the image can occur at any number of image use points. The image file(s) is (are) digitally processed at the image use point(s) 468 and 470 (also referred to as image processing points). According to various embodiments, the digital processing at one of the image use points includes digitally filtering the image file. One example of digitally filtering includes digitally modifying the multicolor images. Examples of digitally modifying the multicolor images include, but are not limited to, selectively dropping out at least one color at a scoring processing point, selectively adjusting an intensity of at least one color at the scoring processing point, and selectively adjusting a color contrast at the scoring processing point.

One of ordinary skill in the art will understand, upon reading and comprehending this disclosure, that other digital processing can be performed at the image use points. For example, various embodiments compress the image through various compression techniques and/or image extraction techniques. Furthermore, various embodiments adjust adjustable features in the image. Adjustable image features include color, contrast, brightness, line thickness, fill, text style, and the like.

At 472, the image file(s) are archived. In some embodiments, the image file(s) are compressed through various compression techniques, as represented at 474. One of ordinary skill in the art will understand, upon reading and comprehending this disclosure, that the desirable degree of compression is a function of the specific application.

Figure 5:
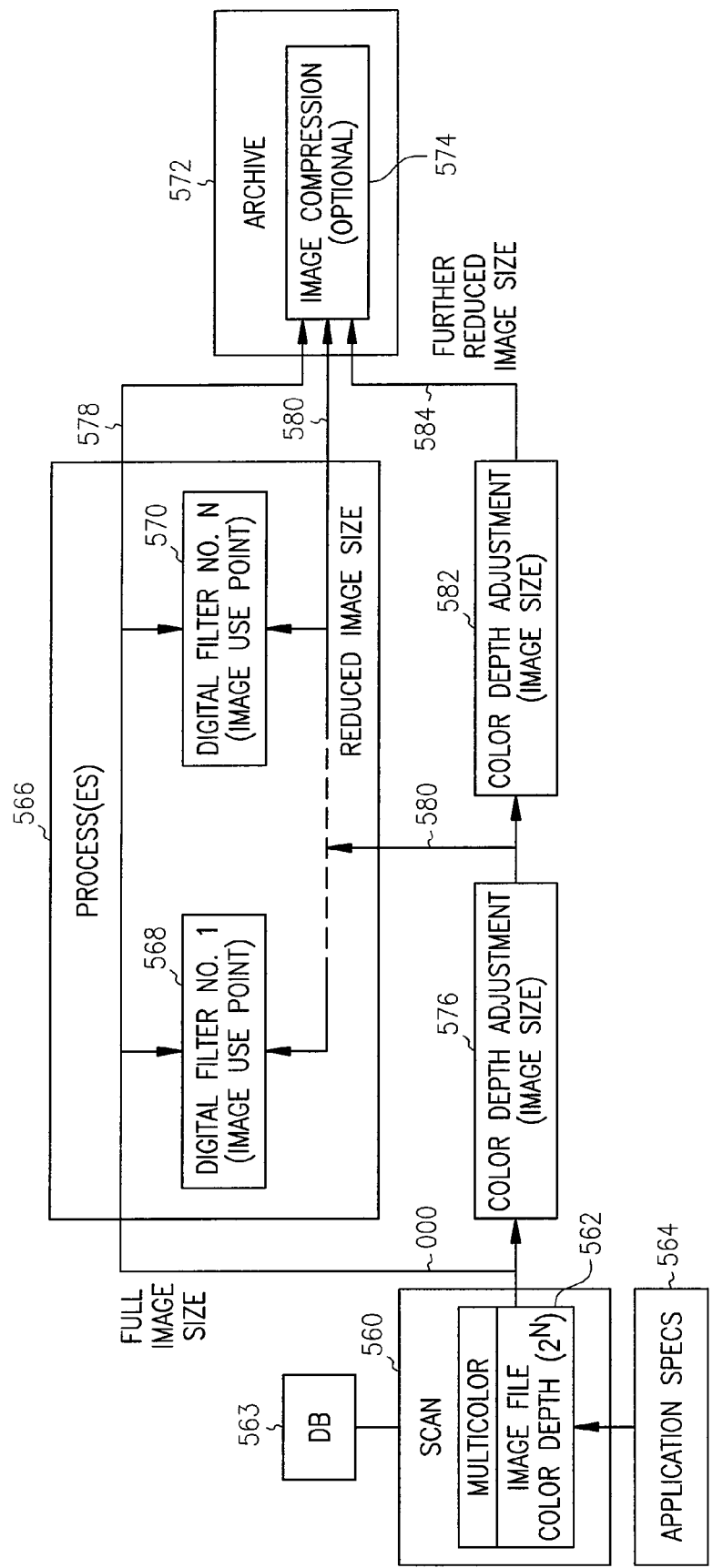
FIG. 5 illustrates a method for processing test answer sheets according to various embodiments of the present subject matter.

FIG. 5 illustrates a method for processing test answer sheets according to various embodiments of the present subject matter. A scan is performed at 560. According to various embodiments, the scan 560 is capable of detecting any color on the forms. The full visible spectrum scan records images of the forms, such as standardized test answer sheet, in at least one scanned image file 562 on at least one computer readable medium. The image file 562 is associated with a color depth. According to various embodiments, application specifics 564 are used to determine a desirable color depth for a given application.

Additionally, the scan determines identifiers on the scanned sheets (also referred to herein as documents). One example of an identifier is a bar code, but the present subject matter is not so limited. One or multiple scanning devices can be used to capture the multicolor image and to determine the document identifiers. The multicolor images are associated with the identifiers in a database 563, which communicates with the scanner 560.

At 566, the scanned image file(s) is (are) processed at image use points (568 and 570) to score the test answer sheets. Although two image use points are illustrated, the processing of the image can occur at any number of image use points. The image file(s) is (are) digitally processed at the image use point(s) 568 and 570. According to various embodiments, the digital processing at one of the image use points includes digitally filtering the image file. One of ordinary skill in the art will understand, upon reading and comprehending this disclosure, that other digital processing can be performed at the image use points.

At 576, the image file(s) are modified into a reduced file size for processing 566 as desired for the application and the available communication and processing bandwidth of the system. In the illustration, the color depth is adjusted. One of ordinary skill in the art will understand, upon reading and comprehending this disclosure, that other compression techniques can be used to reduce the file size. According to various embodiments, both the full image (as represented at line 578) and the reduced image (as represented at line 580) are available to be processed at the image use point(s) 568 and 570. The reduced image 580 is processed first. If during the processing of the image, it becomes apparent that more image information is required, the process is able to refer to the original scanned image 578. Thus, smaller image file sizes are capable of being used to adequately score the majority of test sheets, while larger image file sizes are selectively used to resolve ambiguities that may occur during processing.

One of ordinary skill in the art will understand, upon reading and comprehending this disclosure, that various embodiments of the present subject matter perform the scan 578 using two or more dropout scanners. According to various embodiments, the resulting image from a first one of the dropout scanners is primarily used in the processes, and the resulting image from a second one of the dropout scanners is used in the processes to resolve ambiguities in the scored image. An example of such an ambiguity involves undetected answer marks where answer marks are expected. Referring to the second dropout scanner determines if the answers were marked using color marking dropped by the first dropout scanner.

At 572, the image file(s) are archived. In some embodiments, the image file(s) are further reduced through various compression techniques at 574. In the illustration, the color depth is adjusted at 582. One of ordinary skill in the art will understand, upon reading and comprehending this disclosure, that other compression techniques can be used to reduce the file size. Furthermore, one of ordinary skill in the art will understand, upon reading and comprehending this disclosure, that the original scanned image (as represented by line 578) and/or any derivation of the original scanned image (as represented by line 580 and 584), are capable of being archived.

Thus, the present subject matter provides the flexibility to design a scan system to reduce the communication and processing bandwidth requirements while maintaining an ability to resolve problematic cases where it is desirable to reference the accurate, original scanned image. One of ordinary skill in the art will understand, upon reading and comprehending this disclosure, how to design systems to perform a variety of methods for various specific applications. As such, the present subject matter is not limited to the illustrated methods shown in FIGS. 4 and 5.

Figure 6:
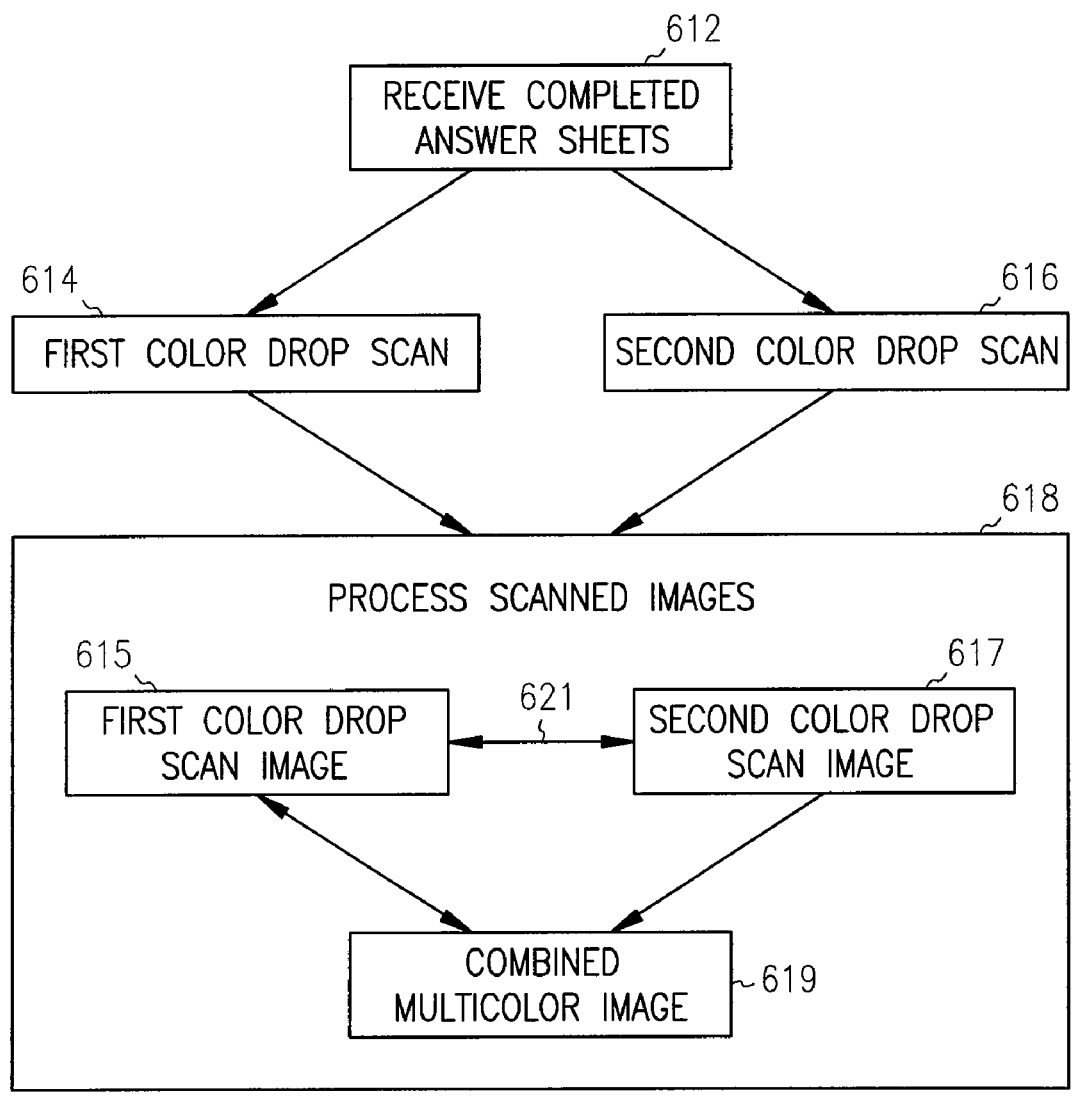
FIG. 6 illustrates a multi-scan method for scanning documents and for processing the multicolor images according to various embodiments of the present subject matter.

FIG. 6 illustrates a multi-scan method for scanning documents and for processing the multicolor images according to various embodiments of the present subject matter. Completed answer sheets are received at 612. The sheets are scanned using image scanners that drop out at least part of the visible spectrum (referred to herein as "dropout scanners"). At 614, the answer sheets are scanned by a first dropout scanner to form a first image(s) 615. At 616, the answer sheets are scanned by a second dropout scanner to form a second image(s) 617. According to various embodiments, the first dropout scanner and the second dropout scanner scan concurrently. According to various embodiments, the first dropout scanner and the second dropout scanner scan sequentially. In various embodiments, the first and second image(s) 615 and 617 are combined into an image 619. In various embodiments, the first and second image(s) 615 and 617 are associated with each other as represented by line 621, but remain separate image files. At 618, the scanned images are automatically processed to score the answers. In various embodiments, for example, a first image(s) from the first dropout scanner is processed, and a second image(s) from the second dropout scanner is processed. In some embodiments, the second image(s) is processed only after the processing of the first image(s) raises an error flag. In various embodiments, for example, an error flag indicates that answers were not detected by the first dropout scanner, such as may occur when a test is completed with a color pen. Together, the first dropout scanner and the second dropout scanner are capable of capturing any visible color (such as pencil or any color pen).

In various embodiments, the scanned images are processed using a programmed computer. In various embodiments, as will become apparent to one or ordinary skill in the art upon reading and comprehending this disclosure, the programmed computer is capable of automatically performing various processes and is capable of performing various processes in response to user input(s) to automatically score or assist with scoring the tests. Digital processes include, but are not limited to, digitally filtering/enhancing images, comparing images that contain answer markings to answer key images, distributing images to readers, registering, cropping and extracting answer areas in scanned images, recognizing handwritten responses, enhancing images of handwritten responses, adjusting color/intensity of various portions of the image, and various combinations thereof.

Figure 7:
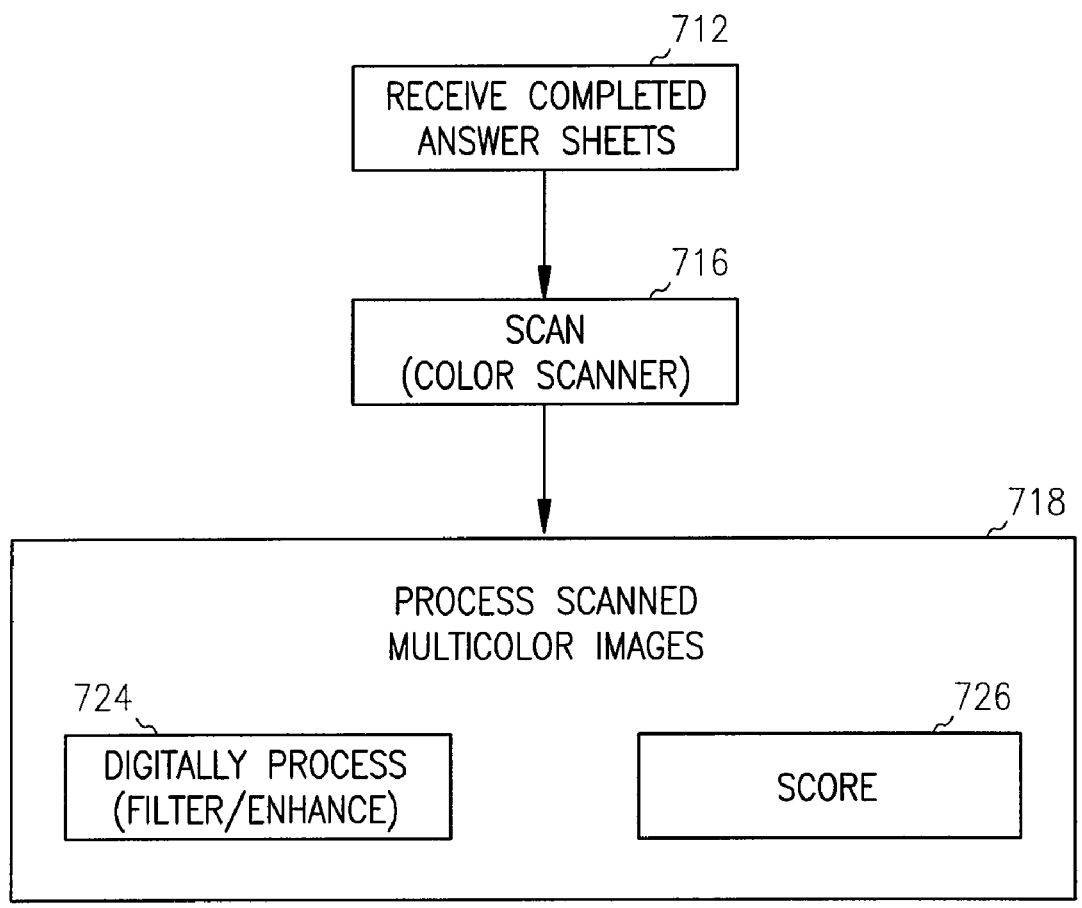
FIG. 7 illustrates a one-scan method for scanning the documents and for processing the multicolor images according to various embodiments of the present subject matter.

FIG. 7 illustrates a one-scan method for scanning and for processing multicolor images according to various embodiments of the present subject matter. Completed answer sheets are received at 712. At 716, the answer sheets are scanned to detect the answers, regardless of the color of the answer markings. In various embodiments, a color scanner is used to scan the answer sheets. At 718, the scanned images (also referred to herein as answer images) are processed as represented at 724. In various embodiments, processing the scanned images includes scoring the images, as represented at 726. The answer images are digitally processed, such as filtering and the like, at the point of use.

In various embodiments, processing the scanned images includes electronically comparing the answer images to an answer key image to automatically score the standardized test answer sheets. In various embodiments, for example, pixels from the answer image and pixels from the answer key image are automatically compared. One of skill in the art will understand, upon reading and comprehending this disclosure, that the term "coordinate" can be used in lieu of the term "pixel". One of ordinary skill in the art will understand, upon reading and comprehending this disclosure, that both the answer image and the answer key image are appropriately registered or positioned in a known relationship such that a meaningful comparison can be performed between these images to determine if a correct answer has been given in response to a specific test question. If a match is found for a number of pixels representing an answer marking on the answer image (within an appropriate error margin), the recorded answer on the test sheet is scored as a correct answer. If a match is not found for a number of pixels representing an answer marking on the answer image (within an appropriate error margin), the recorded answer on the test sheet is scored as an incorrect answer.

Given the ability to detect and record visible colors, various embodiments of the present subject matter ask test takers to answer questions using color. For example, test instructions may provide to color a triangle red and a square blue. The questions answered using color also can be automatically scored according to the present invention.

Figure 8:
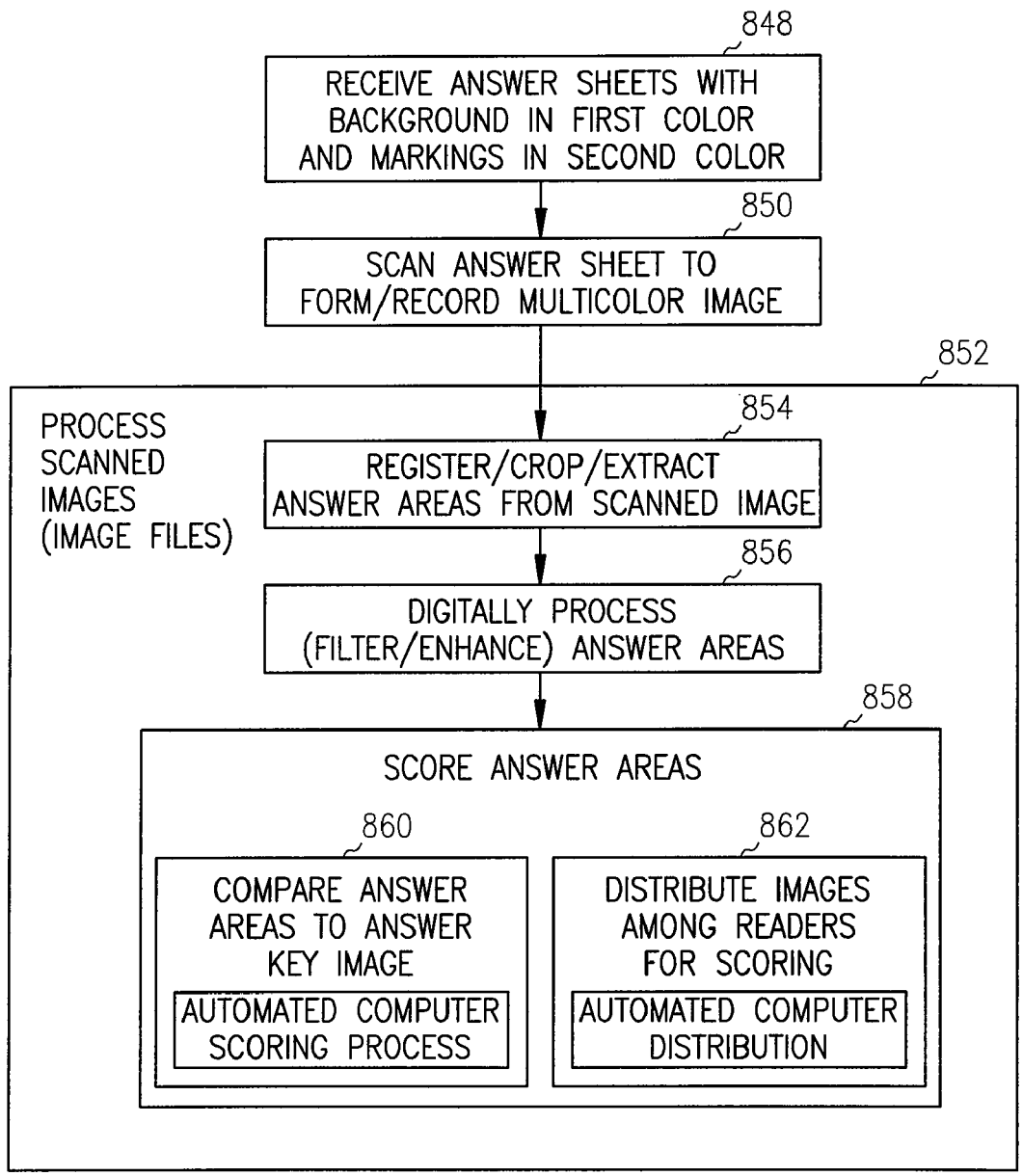
FIG. 8 illustrates a method for processing answer sheets according to various embodiments of the present subject matter.

FIG. 8 illustrates a method for processing answer sheets according to various embodiments of the present subject matter. At 848, the completed answer sheets are received. The received answer sheets have a background in at least a first color and answers marked in at least a second color. At 850, the received answer sheets are scanned, such as by a color scanner, to scan and form multicolor images of answer sheets. The answer sheet image files are processed at 852.

In various embodiments, the answer sheet images are registered, cropped or otherwise processed at 854 to extract answer areas from the scanned answer sheet images. The registering and cropping of the answer sheet images accurately identifies the position and orientation of the image so that the possible answer locations are at known location (via known coordinates, for example) in the image. Additionally, the size of the extracted answer areas is smaller than the size of the entire answer sheet images, thus reducing bandwidth and image storage requirements. The answer sheet images are digitally processed, such as filtered, enhanced and the like, at 856, so that the images are more easily scored.

The answer areas are scored at 858. In various embodiments, scoring the answer areas includes comparing a registered answer area image to an answer key image as represented at 860. The scanned image and the answer key image have a known relationship such that the answer area images are capable of being scored by comparing the two images in an automated computer scoring process. In various embodiments, scoring the answer areas includes automatically distributing the images among readers for scoring as represented at 862. For example, the U.S. patent application entitled "System For Programmable Presentment Of Scoring Tasks To A Plurality Of Reviewers," Ser. No. 10/140,769, filed on May 7, 2002, which was previously incorporated by reference in its entirety, provides systems and methods for distributing images among readers.

Figure 9:
FIG. 9 illustrates one example of an answer sheet in which an answer is written in a non-answer area.
Figure 10:
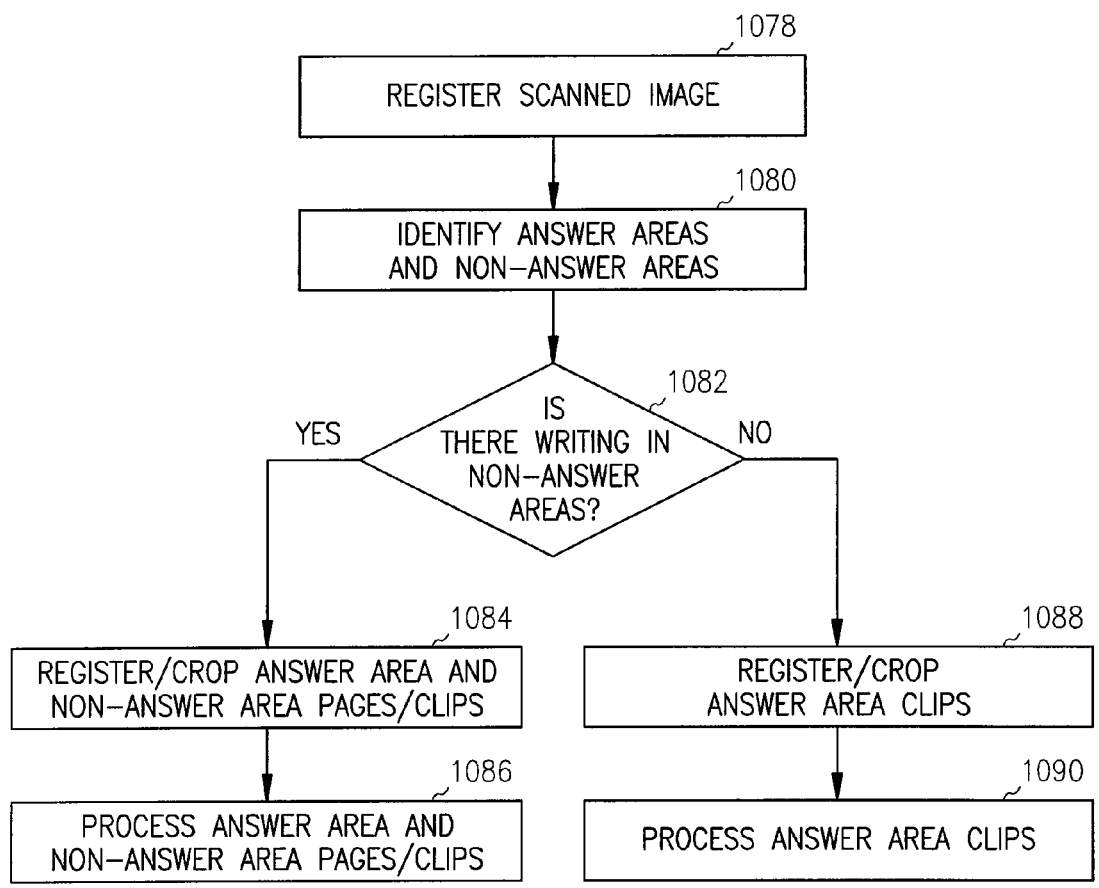
FIG. 10 illustrates a method for processing scanned images that verifies whether there is writing in non-answer areas in the answer sheet according to various embodiments of the present subject matter.
Figure 11:
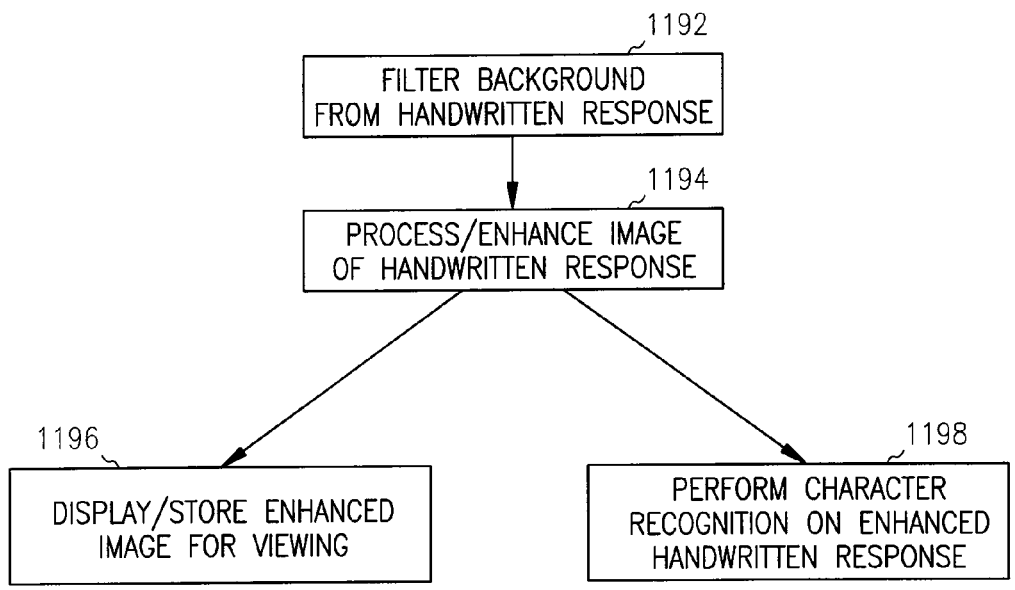
FIG. 11 illustrates a method for processing handwritten responses in scanned images according to various embodiments of the present subject matter.

FIGS. 9-11 illustrate some automated processes according to various embodiments of the present subject matter. Some standardized tests include questions for which the answers to those questions are evaluated and scored by a human reviewer, also referred to herein as a reader. Answer areas in the answer sheets for these questions are scanned and presented to a reader. Various embodiments extract or clip the answer area images from the remainder of the scanned image in order to reduce the file size, which provides benefits for both storage and processing bandwidth. However, some test-takers write answers outside of a scanned answer area.

FIG. 9 illustrates one example of an answer sheet in which an answer is written in a non-answer area. The illustrated answer sheet 972 has an answer area 974 where an answer is intended to be written and a non-answer area 976 where an answer is not intended to be written. A test-taker answers the question by writing an answer in the answer area. When the answer sheet is scanned, various embodiments of the system store only the image clip area where the answer is intended to be written so as not to take up unnecessary memory storage by storing those areas of the sheet not intended to be used for writing answers. If the test-taker writes the answer outside of the answer area, however, that answer will not be stored as part of the image clip area. Scoring errors can be caused by this omission.

FIG. 10 illustrates a method for processing scanned images that verifies whether there is writing in non-answer areas in the answer sheet according to various embodiments of the present subject matter. A scan is used to detect any visible answer markings on the test sheets. According to various embodiments, the scanned image is registered or positioned into a known position at 1078. Based on the registered position of the answer areas and the known position of the intended answer areas, the answer areas and the non-answer areas are identified at 1080. At 1082, it is determined whether there is writing in the non-answer areas. In various embodiments, non-answer areas in a test sheet template are compared to the non-answer areas of the scanned images to determine if there is writing in the non-answer areas.

If writing is not found in the non-answer areas, various embodiments extract answer area clips at 1088 through a registering or cropping process, and processes the extracted answer area clips at 1090. If writing is found in the non-answer areas, various embodiments extract the appropriate answer areas and the appropriate non-answer areas at 1084 through a registering or cropping process, and processes the answer areas and the non-answer areas at 1086.

Some handwritten responses are difficult to read or process. Some automatic processes involve enhancing and/or recognizing these handwritten responses. FIG. 11 illustrates a method for processing handwritten responses in scanned images according to various embodiments of the present subject matter. According to this method, the background of an answer sheet is filtered out at 1192 to leave the handwritten response. At 1194, the image of the handwritten response left after removing the background is digitally processed to enhance the image for further processing. At 1196, the enhanced image is displayed for viewing, or stored for future viewing. At 1198, a character recognition process is performed on the enhanced image to accurately recognized the response. The recognized handwritten response is capable of being stored as a text file, which is significantly smaller than an image file. These smaller text files are easier to store and transfer than larger image files. One benefit of using such a character recognition of handwritten responses involves the ability to automatically perform a character-to-character comparison of the recognized handwritten response to an answer key. Another benefit of using such a character recognition of handwritten responses involves the ability to integrate handwritten responses with a system that handles keystroke responses from a test-taker, such as that which occurs in an on-line test-taking environment. One use for such a system involves a situation where some test-takers are able to take an on-line test, and other test-takers are not able to take the on-line test. The ability to recognize handwritten responses allows the same system to be used for both sets of test-takers.

Figure 12:
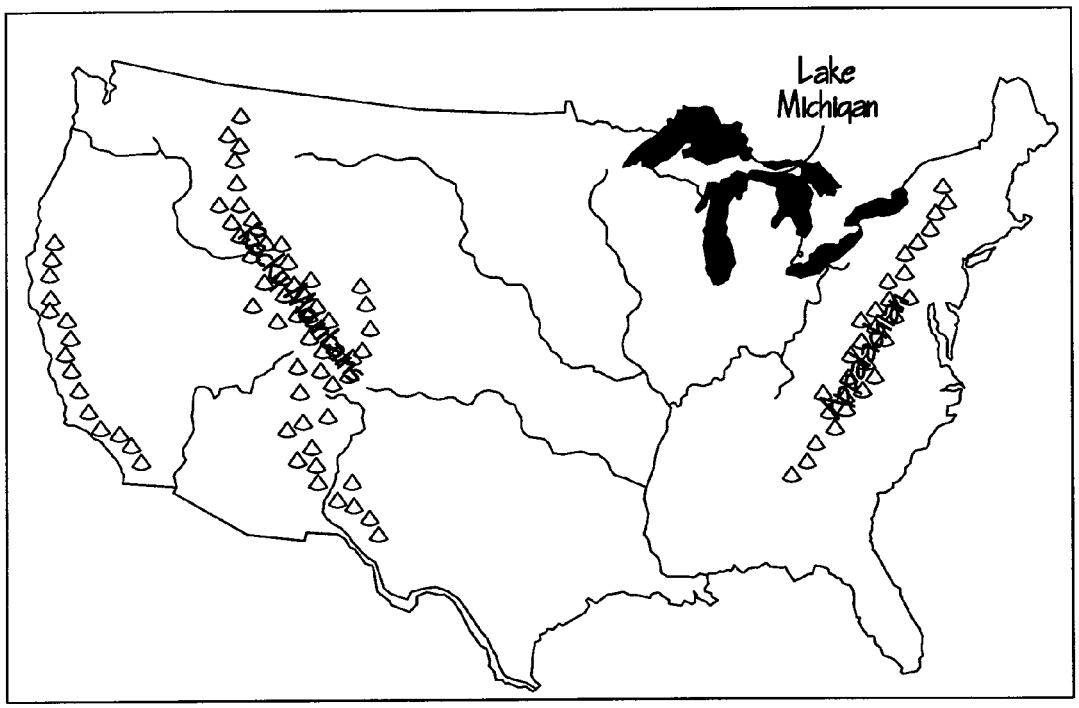
FIG. 12 illustrates a test question for which handwritten answers are written on a map.
Figure 13:
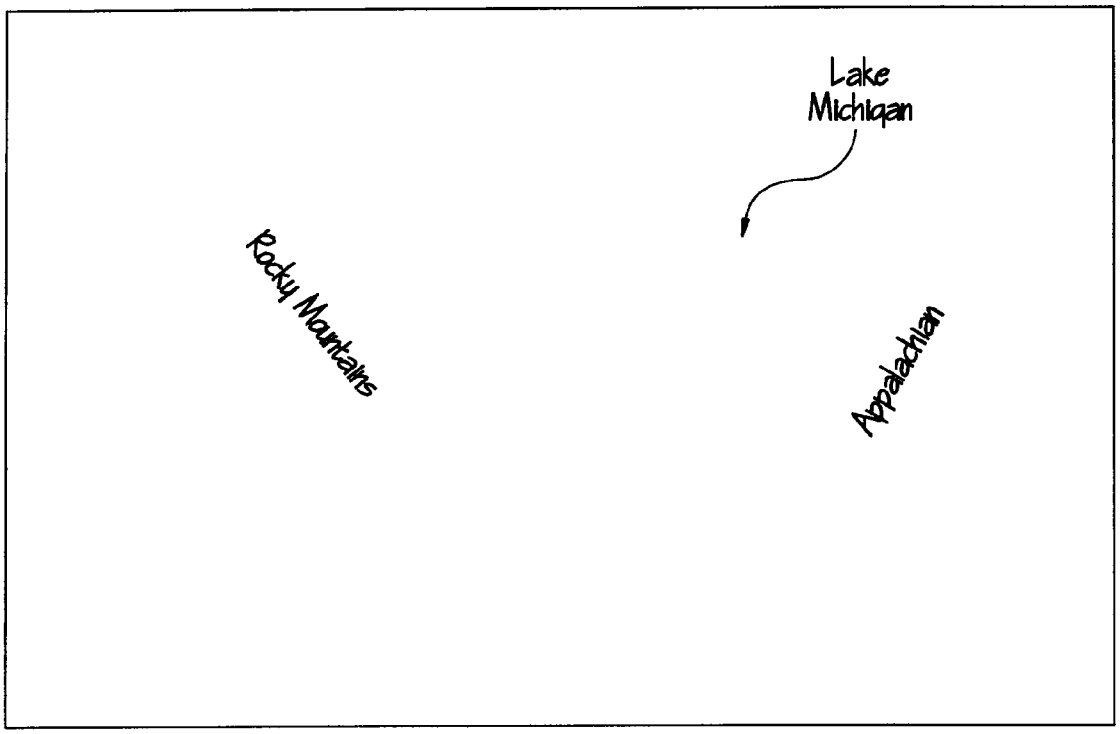
FIG. 13 illustrates an image of the extracted handwritten answers in which the background of the test question has been dropped.
Figure 14:
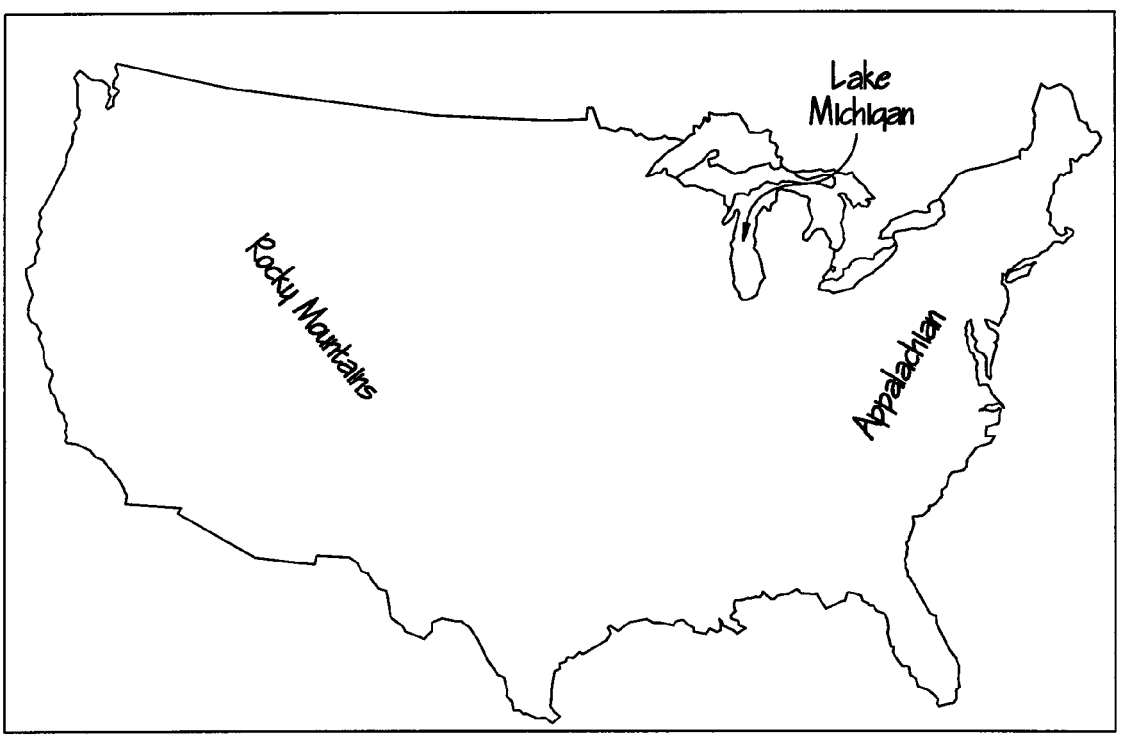
FIG. 14 illustrates digitally processed image that includes the handwritten answers and portions of the background to assist with scoring.

FIGS. 12-14 illustrate some user-directed processes that occur at an image use point according to various embodiments of the present subject matter. Some standardized tests include questions for which the answers to those questions are evaluated and scored by a reader. Some of these handwritten answers are difficult to read and process. For example, some standardized tests include images of maps, and require the test-taker to identify portions of the map by writing on the map. However, it can be difficult to identify and evaluate the writing on the map.

FIG. 12 illustrates a test question for which handwritten answers are written on a map. The illustrated map is a topographical map of the United States that indicates some mountain ranges and bodies of water. Suppose, for example, that the question asks the test-taker to identify the Rocky Mountains, the Appalachian Mountains, and Lake Michigan. FIG. 12 represents an example of a test-takers response such as that which may be obtained by scanning the answer sheet. A reader would find the writing on the map to be difficult to read.

A reader is capable of digitally processing the image to assist with scoring the test questions. In various embodiments, the map is printed in a background color that is capable of being distinguished from the written responses. As previously provided above, the background color can be filtered or otherwise modified at the image use point.

FIG. 13 illustrates an image of the extracted handwritten answers in which the background of the test question has been dropped. The background map is filtered out from the image, leaving the answer marks in the image. A reader would likely be able to determine that the mountain ranges are properly identified, but would have difficulty in determining whether the test-taker properly identified Lake Michigan.

FIG. 14 illustrates digitally processed image that includes the handwritten answers and portions of the background to assist with scoring. According to various embodiments, all or various portions of the original features of the background map are able to be removed or otherwise adjusted. In various embodiments, the reader controls which portions of the image are removed and/or adjusted as desired to assist a reader with scoring an answer.

In various embodiments, as represented in the illustration of FIG. 14, a portion of the background map, such as representations for the mountain ranges or the rivers for example, is removed. In this example, the handwritten responses "ROCKY MOUNTAINS" and "APPALACHIAN" are clear because the representations of the mountains have been removed. The outline of the Great Lakes remains such that the reader is able to determine whether the handwritten arrow is pointing to Lake Michigan.

In various embodiments, various portions of the background are capable of being removed under the control of the reader or user. In various embodiments, an image feature for at least one of an answer in the answer sheet image and the background is capable of being adjusted by the reader to assist the reader with scoring the answer sheet. Examples of adjustable image features include color, contrast, brightness, line thickness, fill, text style, and the like. In various embodiments, these image features are capable of being adjusted under control of the reader or user.

Figure 15:
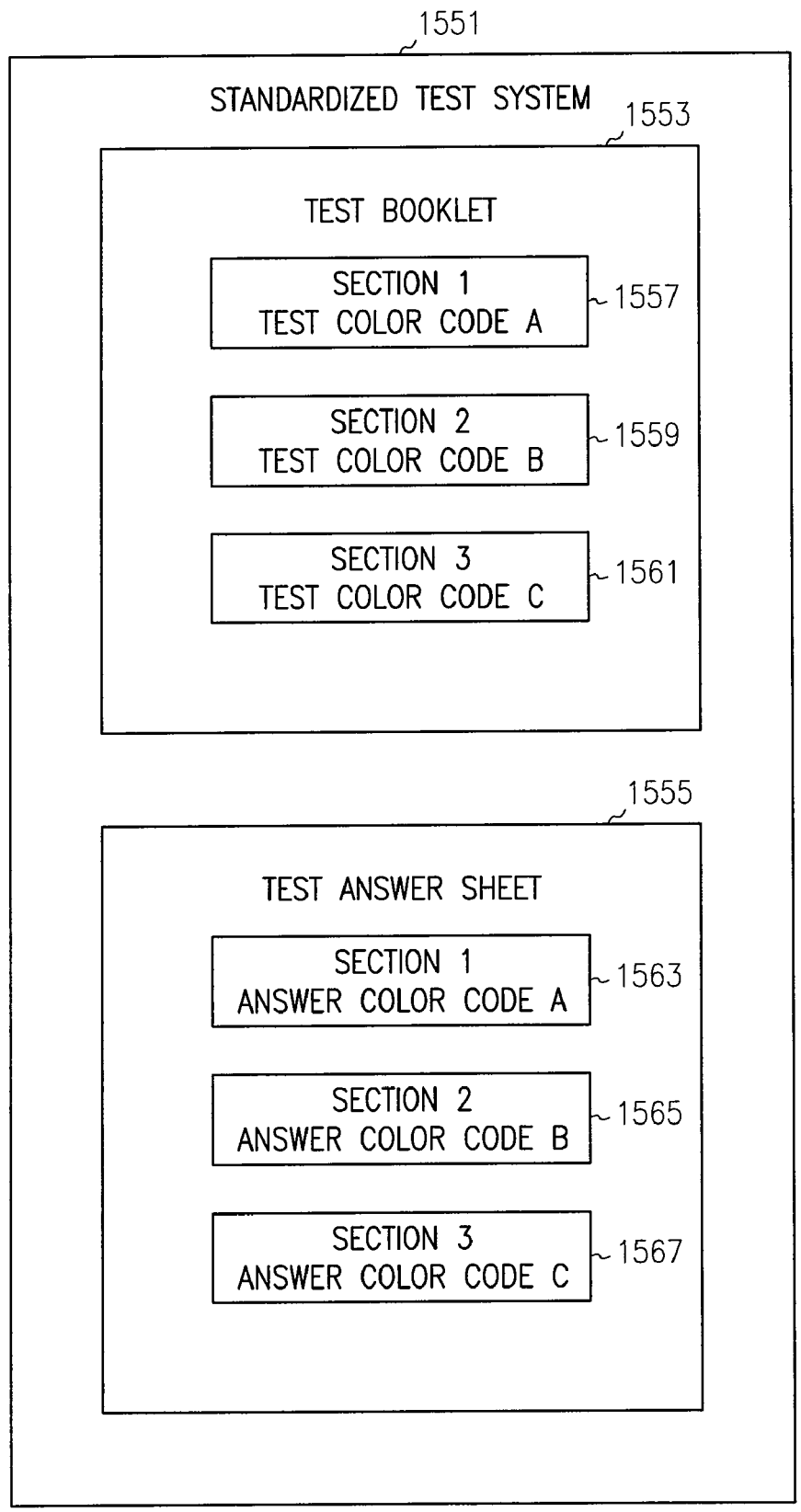
FIG. 15 illustrates a standardized test system that includes test booklets with sections coded with a test color code and further includes test answer sheets with sections coded with an answer color code that corresponds to the test color code, according to various embodiments of the present subject matter.

FIG. 15 illustrates a standardized test system that includes test booklets with sections coded with a test color code and further includes test answer sheets with sections coded with an answer color code that corresponds to the test color code, according to various embodiments of the present subject matter. In various embodiments, the test system 1551 includes a number of test booklets represented at 1553 and a number of test answer sheets represented at 1555. Each test booklet includes a number of question sections. For example, FIG. 15 illustrates a test booklet that includes three sections (Section 1 1557, Section 2 1559, and Section 3 1561). These question sections are delineated in various ways according to various embodiments. In various embodiments, for example, the sections are delineated according to subject matter (e.g. Math, Science, and the like). Each test answer sheet 1555 includes a number of answer sections that correspond to and are used to answer the question sections in the test booklets. For example, Section 1 1563, Section 2 1565, and Section 3 1567 in the test answer sheet are used to answer Section 1 1557, Section 2 1559, and Section 3 1561, respectively, in the test booklet.

Each of the question sections has a test color code, and each of the answer sections has an answer color code. The test color code and the answer color code correspond with each other to assist a test-taker with completing a given question section by marking answer in the corresponding answer section.

According to various embodiments, the background color for the answer section include or otherwise function as the answer color code. One example of a background includes available answers to multiple choice questions. For example, Section 1 in the test answer sheet has a background color A that corresponds to color A of Section 1 in the test booklet. The background colors are capable of being filtered out, leaving the answer markings.

In various embodiments, the color codes include a pattern or a texture that further assist a test-taker with completing a given question section by marking answers in the corresponding answer section. Examples of a patterned background include, but are not limited to, horizontal, vertical and various diagonal lines. In various embodiments, the color codes include stylized writing that further assist a test-taker with completing a given question section by marking answers in the corresponding answer section. Examples of stylized writing include, but are not limited to, bold or italicized fonts. According to various embodiments, the graphical features include various combinations of color, pattern, and stylized writing that further assist a test-taker with completing a given question section by marking answers in the corresponding answer section.

As has been provided above, the present subject matter provides improved systems and methods for processing forms that include color. Various embodiments provide improved systems and methods for processing standardized test forms.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present subject matter. It is to be understood that the above description is intended to be illustrative, and not restrictive. Combinations of the above embodiments, and other embodiments will be apparent to those of skill in the art upon reviewing the above description. The scope of the present subject matter should be determined with reference to the appended claims, along with the full scope of equivalents to which such claims are entitled.

What is claimed is:

1. A method for processing a plurality of completed test answer sheets in a standardized test system, wherein the plurality of completed test answer sheets have at least three colors and the system includes a scanning station and a separate scoring processing station, the method comprising:
    scanning each completed test answer sheet to determine an identifier for the completed test answer sheet and to form a multicolor image representative of the completed test answer sheet, wherein the multicolor image includes at least three colors;
    creating a first computer readable file and a smaller second computer readable file representative of the multicolor image;
    associating the first and second computer readable files with the identifier in a database;
    transmitting the smaller second computer readable file representative of the multicolor image to the scoring processing station;
    transmitting the first computer readable file representative of the multicolor image if an instruction is received, wherein the received instruction indicates that more image information, than that which is provided by the second computer readable file, is desired to score the completed test answer sheet;
    using the first computer readable file or the second computer readable file to form a representation of at least a portion of the completed test answer sheet to be displayed at the scoring processing station to be scored by a human reader, wherein the representation includes a background portion and handwritten responses;
    receiving at least one instruction initiated by the human reader at the scoring processing station for changing the background portion of the representation to be displayed at the scoring processing station, wherein the at least one instruction includes a reader-selected color in the background portion of the representation; and
    in response to the instruction, the scoring station communicating information with the database to remove the reader-selected color from the background portion of the representation displayed at the scoring station or to adjust an intensity of the reader-selected color in the background portion of the representation displayed at the scoring station.

2. The method of claim 1, wherein the second computer readable file represents the image with fewer colors than the first computer readable file.

3. The method of claim 1, wherein the second computer readable file represents the image with fewer pixels than the first computer readable file.

4. The method of claim 1, wherein the second computer readable file represents the image with less color depth than the first computer readable file.

5. The method of claim 1, further comprising performing an object character recognition process on a handwritten response, wherein the second computer readable file includes a text file.

6. The method of claim 1, further comprising performing an image compression technique on the multicolor image, wherein the second computer readable file represents a compressed multi-color image.

7. The method of claim 1, further comprising performing an image extraction technique on the multicolor image, wherein the second computer readable file represents an extracted portion of the multicolor image.

8. The method of claim 1, further comprising extracting answer area clips from the multicolor image, wherein the second computer readable file represents an extracted answer area clip.

9. The method of claim 8, wherein transmitting the first computer readable file includes transmitting the first computer readable file representative of the multicolor image if the extracted answer area clip does not include an answer.

10. The method of claim 1, further comprising filtering out a background color of a completed test answer sheet to enhance readability of a handwritten answer, wherein the second computer readable file represents the completed test answer sheet with the background color.

11. The method of claim 1, wherein scanning each completed test answer sheet includes using a first drop out color scanner to scan each completed test answer sheet to form a first scanned image representative of the completed test answer sheet and a second drop out color scanner to scan each completed test answer sheet to form a second scanned image representative of the completed test answer sheet, wherein the first drop out color scanner is configured to drop a first color and the second drop out color scanner is configured to drop a different second color.

12. The method of claim 11, further comprising using the second scanned image to add the color dropped out by the first dropout scanner.

13. The method of claim 11, further comprising:
    using the first scanned image and not the second scanned image to form a representation of at least a portion of the completed test answer sheet to be displayed at the scoring processing station; and
    if the representation is unable to be scored, using the second scanned image to form the representation where the representation includes the color dropped by the first drop out scanner.

14. The method of claim 1, wherein the instruction includes an instruction to remove the reader-selected color from the representation, and responding to the instruction by removing only the selected color from the representation to be displayed at the scoring processing station for scoring by the human reader.

15. The method of claim 1, wherein the completed test answer sheets includes a background color, wherein removing the color includes removing the background color in the representation.

16. The method of claim 1, wherein:
    the completed test answer sheets includes a first section that has a first background color and a second section that has a second background color;
    at least one of the first or the second computer readable file are used to form a first representation of a least a portion of the first section to be displayed and a second representation of at least a portion of the second section to be displayed;

removing the color includes removing the first background color in the first representation and removing the second background color in the second representation.

17. The method of claim 1, further comprising:

using the first computer readable file or the second computer readable file to form a representation of at least a portion of the completed test answer sheet to be displayed at the scoring processing station to be scored by a human reader;

receiving at least one instruction initiated by the human reader; and in response to the instruction, adding a color in the representation.

18. The method of claim 17, wherein the instruction includes a selection by the human reader of the color to be added, and adding the selected color.

19. The method of claim 1, wherein the instruction includes an instruction to adjust the reader-selected color in the representation, and responding to the instruction by adjusting the intensity of only the selected color in the representation to be displayed at the scoring processing station for scoring by the human reader.

20. The method of claim 1, further comprising:

using the first computer readable file or the second computer readable file to form a representation of at least a portion of the completed test answer sheet to be displayed at the scoring processing station to be scored by a human reader;

receiving at least one instruction initiated by the human reader; and in response to the instruction, adjusting line thickness, fill or text style in the representation.

* * * * *

UNITED STATES PATENT AND TRADEMARK OFFICE
CERTIFICATE OF CORRECTION

Page 1 of 2

PATENT NO. : 8,385,811 B1
APPLICATION NO. : 12/465842
DATED : February 26, 2013
INVENTOR(S) : Gedlinske et al.

It is certified that error appears in the above-identified patent and that said Letters Patent is hereby corrected as shown below:

On the Title page, Item [56]

On page 3, in column 1, under "Other Publications", line 16, delete "J," and insert --J.,--, therefor On page 3, in column 1, under "Other Publications", line 18, delete "D.C..," and insert --D.C.,--, therefor On page 3, in column 1, under "Other Publications", line 20, delete "Colleges.," and insert --Colleges,--, therefor On page 3, in column 1, under "Other Publications", line 29, delete "G," and insert --G.,--, therefor On page 3, in column 1, under "Other Publications", line 34, delete "Instruction. Proceedings. Addison-Wesley." and insert --Instruction Proceedings, Addison-Wesley,--, therefor On page 3, in column 1, under "Other Publications", line 39, delete "D," and insert --D.,--, therefor On page 3, in column 1, under "Other Publications", line 43, delete "P," and insert --P.,--, therefor On page 3, in column 1, under "Other Publications", line 44, delete "Education.," and insert --Education,--, therefor On page 3, in column 1, under "Other Publications", line 44, delete "2.," and insert --2,--, therefor On page 3, in column 1, under "Other Publications", line 44, after "116", insert --.--, therefor On page 3, in column 1, under "Other Publications", line 49, delete "A," and insert --A.,--, therefor On page 3, in column 2, under "Other Publications", line 1, delete "11.," and insert --11,--, therefor Signed and Sealed this
Seventh Day of January, 2014

Margaret A. Focarino
*Commissioner for Patents of the United States Patent and Trademark Office*

CERTIFICATE OF CORRECTION (continued)
U.S. Pat. No. 8,385,811 B1

On page 3, in column 2, under "Other Publications", line 7, delete "J," and insert --J.,--, therefor On page 3, in column 2, under "Other Publications", line 9-10, delete "Exposition." and insert --Exposition,--, therefor On page 3, in column 2, under "Other Publications", line 10, delete "III." and insert --III,--, therefor On page 3, in column 2, under "Other Publications", line 12, delete "C," and insert --C.,--, therefor On page 3, in column 2, under "Other Publications", line 14, delete "(2).," and insert --(2),--, therefor On page 3, in column 2, under "Other Publications", line 15, delete "T," and insert --T.,--, therefor On page 3, in column 2, under "Other Publications", line 17, delete "F," and insert --F.,--, therefor On page 3, in column 2, under "Other Publications", line 21, delete "F," and insert --F.,--, therefor On page 3, in column 2, under "Other Publications", line 25-28, delete "Pittman, James A, "Recognizing Handwritten Text [Conference Paper]", Human Factors in Computing Systems. Reaching Through Technology. Conference Proceedings. ACM.1991, New York, NY, USA., 271-275." and insert --Pittman, James A., "Recognizing Handwritten Text [Conference Paper]", Human Factors in Computing Systems: Reaching Through Technology, Conference Proceedings, ACM 1991, New York, NY, USA, 271-275.--, therefor On page 3, in column 2, under "Other Publications", line 29, delete "S," and insert --S.,--, therefor On page 3, in column 2, under "Other Publications", line 30, delete "April.," and insert --April,--, therefor On page 3, in column 2, under "Other Publications", line 34, delete "4(2),," and insert --4(2),--, therefor On page 3, in column 2, under "Other Publications", line 39, delete "M," and insert --M.,--, therefor On page 3, in column 2, under "Other Publications", line 39, delete "Where" and insert --where--, therefor On page 3, in column 2, under "Other Publications", line 42, delete "A," and insert --A.,--, therefor